(12) United States Patent
Ogle et al.

(10) Patent No.: US 9,326,020 B2
(45) Date of Patent: Apr. 26, 2016

(54) COMMERCIAL TELEVISION-INTERFACING DONGLE AND SYSTEM AND METHOD FOR USE OF SAME

(71) Applicant: Enseo, Inc., Richardson, TX (US)

(72) Inventors: Vanessa Ogle, Fairview, TX (US); Bill Fang, Plano, TX (US)

(73) Assignee: Enseo, Inc, Richardson, TX (US)

( * ) Notice: Subject to any disclaimer, the term of this patent is extended or adjusted under 35 U.S.C. 154(b) by 0 days.

(21) Appl. No.: 14/883,089

(22) Filed: Oct. 14, 2015

(65) Prior Publication Data

US 2016/0037203 A1 Feb. 4, 2016

Related U.S. Application Data

(63) Continuation-in-part of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 61/498,734, filed on Jun. 20, 2011, provisional application No. 62/063,778, filed on Oct. 14, 2014.

(51) Int. Cl.
```
H04N 7/18        (2006.01)
H04N 21/422      (2011.01)
H04N 21/41       (2011.01)
H04N 21/4367     (2011.01)
H04N 21/4363     (2011.01)
H04N 21/482      (2011.01)
```
(Continued)

(52) U.S. Cl.
CPC ....... *H04N 21/4222* (2013.01); *H04N 21/4126* (2013.01); *H04N 21/42207* (2013.01); *H04N 21/42208* (2013.01); *H04N 21/42224* (2013.01); *H04N 21/4316* (2013.01); *H04N 21/4367* (2013.01); *H04N 21/43632* (2013.01); *H04N 21/43637* (2013.01); *H04N 21/4821* (2013.01); *H04N 21/812* (2013.01)

(58) Field of Classification Search
CPC .................. H04N 21/4222; H04N 21/42208; H04N 21/4126; H04N 21/42224; H04N 21/4367; H04N 21/42207; H04N 21/43637; H04N 21/4821; H04N 21/43632; H04N 21/812; H04N 21/4316
See application file for complete search history.

(56) References Cited

U.S. PATENT DOCUMENTS 6,263,503 B1 7/2001 Margulis
6,741,684 B2 5/2004 Kaars
(Continued)

*Primary Examiner* — Oschta Montoya
(74) *Attorney, Agent, or Firm* — Scott T. Griggs; Griggs Bergen LLP

(57) ABSTRACT

A commercial television-interfacing dongle and system and method for use of the same are disclosed. In one embodiment, a wireless transceiver is located within a housing, which also interconnectively includes a television input, television output, a processor, memory, a control interface, and a universal serial bus (USB) interface. The control interface and the USB interface connect to the commercial television. The commercial television interfacing dongle may establish a pairing with a proximate wireless-enabled interactive programmable device having a display and receive and process virtual remote control functionality input instructions from the proximate wireless-enabled interactive programmable device. Following receipt and processing of the virtual remote control functionality input instructions, the commercial television-interfacing dongle sends a command to the commercial television via a commercial television control protocol.

19 Claims, 4 Drawing Sheets

(51) Int. Cl.
*H04N 21/81* (2011.01)
*H04N 21/431* (2011.01)

(56) References Cited

U.S. PATENT DOCUMENTS

| | | | |
|---|---|---|---|
| 7,109,974 B2 | 9/2006 | Kempisty | |
| 8,170,722 B1 * | 5/2012 | Elberbaum | H04L 12/281 |
| | | | 455/151.1 |
| 8,286,204 B2 | 10/2012 | Fukuda et al. | |
| 8,650,600 B2 | 2/2014 | Ogle et al. | |
| 8,875,195 B2 | 10/2014 | Ogle et al. | |
| 2002/0059621 A1 | 5/2002 | Thomas et al. | |
| 2002/0143805 A1 | 10/2002 | Hayes et al. | |
| 2003/0073411 A1 | 4/2003 | Meade | |
| 2005/0005297 A1 | 1/2005 | Lee | |
| 2005/0035846 A1 | 2/2005 | Zigmond et al. | |
| 2005/0097618 A1 | 5/2005 | Arling et al. | |
| 2005/0108751 A1 | 5/2005 | Dacosta | |
| 2005/0262535 A1 | 11/2005 | Uchida et al. | |
| 2009/0298535 A1 * | 12/2009 | Klein | H04N 21/43615 |
| | | | 455/556.1 |
| 2010/0082485 A1 | 4/2010 | Lin et al. | |
| 2010/0082491 A1 | 4/2010 | Rosenblatt et al. | |
| 2010/0188279 A1 | 7/2010 | Shamilian et al. | |
| 2011/0007018 A1 | 1/2011 | McKinley et al. | |
| 2011/0067059 A1 | 3/2011 | Johnston et al. | |

* cited by examiner

COMMERCIAL TELEVISION-INTERFACING DONGLE AND SYSTEM AND METHOD FOR USE OF SAME

PRIORITY STATEMENT & CROSS-REFERENCE TO RELATED APPLICATIONS

This application is a continuation-in-part of U.S. application Ser. No. 14/177,876, entitled "Set Top/Back Box, System and Method for Providing a Remote Control Device" and filed on Feb. 11, 2014, in the names of Vanessa Ogle et al., and issued on Oct. 28, 2014, as U.S. Pat. No. 8,875,195; which is a continuation of U.S. application Ser. No. 13/528,663 entitled "Set Top/Back Box, System And Method For Providing A Remote Control Device" and filed on Jun. 20, 2012, in the names of Vanessa Ogle, et al., and issued on Feb. 11, 2014, as U.S. Pat. No. 8,650,600; which claims priority from U.S. Patent Application No. 61/498,734, entitled "Set Top/Back Box, System and Method for Providing a Remote Control Device" and filed on Jun. 20, 2011, in the names of Vanessa Ogle et al. This application also claims priority from U.S. Application Ser. No. 62/063,778, entitled Commercial Television-Interfacing Dongle and System and Method for Use of Same" and filed on Oct. 14, 2014, in the names of Ogle et al; all of which are hereby incorporated by reference for all purposes.

TECHNICAL FIELD OF THE INVENTION

This invention relates, in general, to dongles and, in particular, to commercial television-interfacing dongles providing enhanced content and systems and methods for use of the same that address and supplement the content typically received from an external signal source and provided to a commercial television.

BACKGROUND OF THE INVENTION

Without limiting the scope of the present invention, the background will be described in relation to commercial televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments.

To the hospitality lodging industry, however, the costs of upgrading equipment across all rooms in all hotel properties may be considerable—especially in a competitive marketplace, like the hospitality lodging industry—having price-sensitive consumers. Accordingly, there is a need for improved systems and methods for providing enhanced content in an easy-to-use platform in the hospitality lodging industry. Further, there is a need for affordable systems and methods for providing the enhanced content.

SUMMARY OF THE INVENTION

It would be advantageous to achieve a television-interfacing dongle that would improve upon existing limitations in functionality. It would also be desirable to enable a computer-based electronics and software solution that would provide enhanced content in an easy-to-use platform in the hospitality lodging industry or in another environment. Further, it would be desirable to enable an affordable solution, especially for the commercial environment. To better address one or more of these concerns, a commercial television-interfacing dongle providing enhanced content and system and method for use of the same are disclosed.

In one embodiment of the commercial television-interfacing dongle, a wireless transceiver is located within a housing, which also interconnectively includes a processor, memory, storage, a control interface, and a universal serial bus (USB) interface. The control interface and the USB interface connect to the commercial television. The commercial television-interfacing dongle may establish a pairing with a proximate wireless-enabled interactive programmable device having a display and receive and process virtual remote control functionality input instructions from the proximate wireless-enabled interactive programmable device. Following receipt and processing of the virtual remote control functionality input instructions, the commercial television-interfacing dongle sends a command to the commercial television via a commercial television control protocol. The commercial television-interfacing dongle thereby provides remote control functionality to the commercial television and, in one embodiment, access to a program guide via the commercial television-interfacing dongle. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
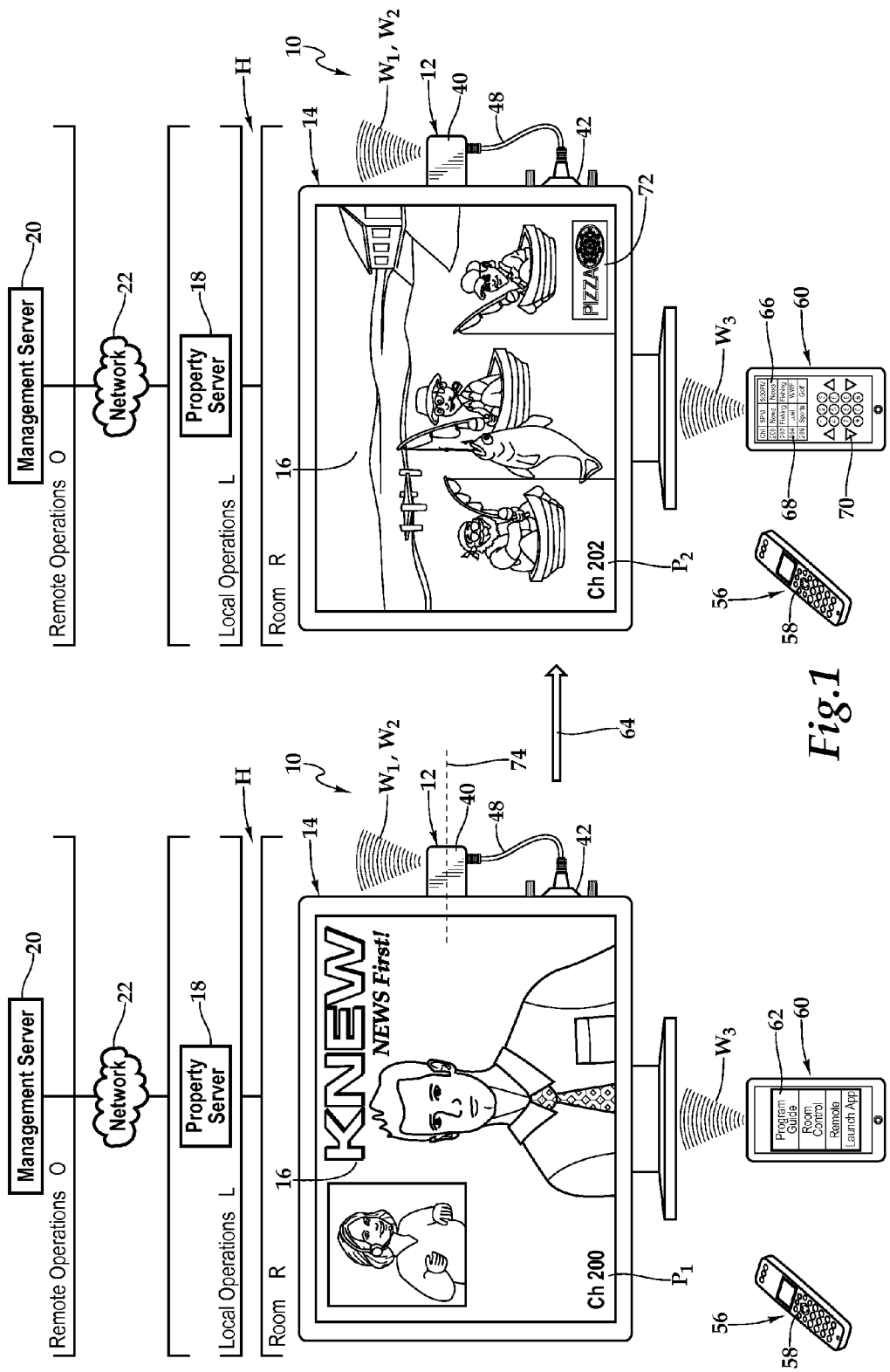
FIG. 1 is schematic diagram depicting one embodiment of a system for providing a commercial television-interfacing dongle having enhanced content thereon according to the teachings presented herein.
Figure 2:
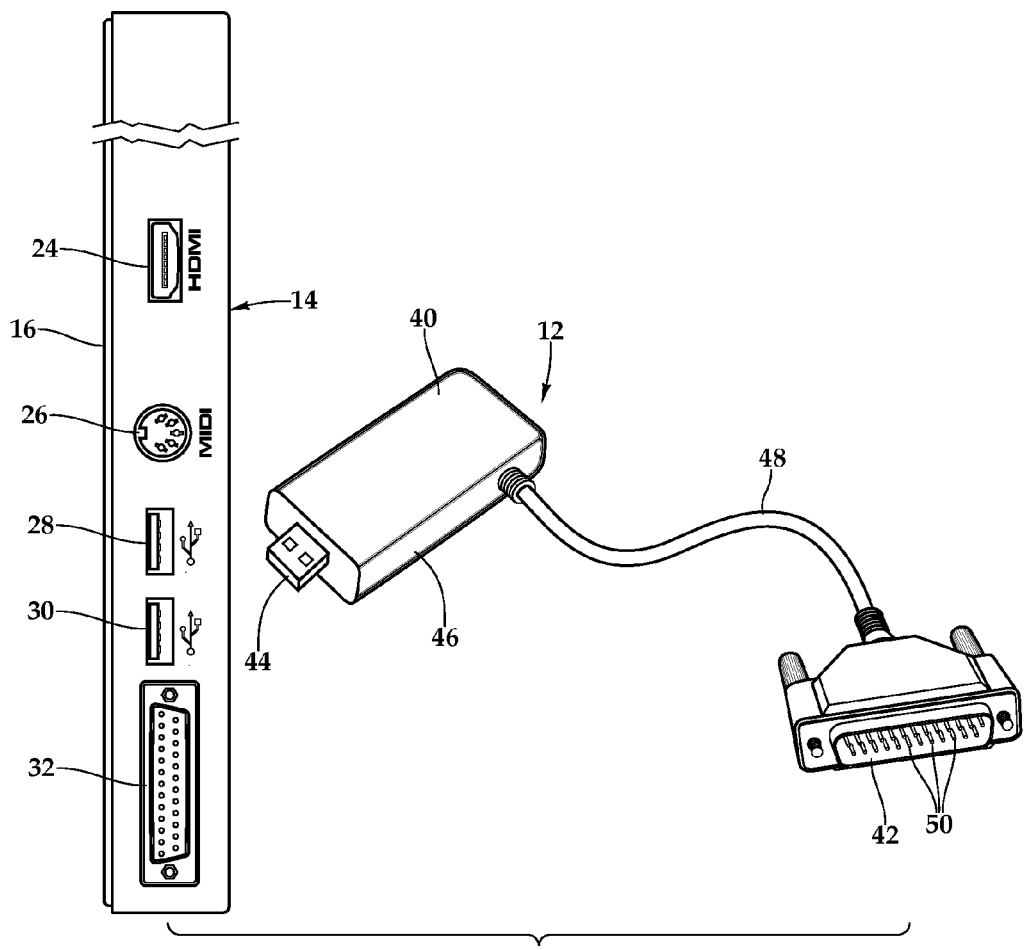
FIG. 2 is a front perspective view of one embodiment of the commercial television-interfacing dongle and a commercial television depicted in FIG. 1 in further detail.

Referring initially to FIG. 1 and FIG. 2, therein is depicted one embodiment of a system 10 utilizing a commercial television-interfacing dongle 12 with enhanced content-supporting capabilities being employed within a hospitality lodging establishment H. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R and back-of-the-house local operations L. The commercial television-interfacing dongle 12 may be communicatively disposed with various amenities associated with the hospitality environment H, including a commercial television 14 having a screen 16. Commercial television-interfacing dongles, like the commercial television-interfacing dongle 12, may be deployed throughout the rooms R of the hotel H and are in communication with a property server 18, which may be co-located at the hotel H. The property server 18 may include a headend, which provides a master facility for receiving television signals for processing and distribution throughout the hotel H, and a hospitality suite, which represents a set of services, including check in/check out, maid service, spa, room service, and front desk, for example. The hotel H may be disposed in communication with remote operations O as well, including a management server 20, by way of a network 22, such as the Internet.

As shown, in one embodiment, within the room R, the system 10 includes the commercial television-interfacing dongle 12 and a display illustrated as the commercial television 14 having the screen 16. The commercial television 14 includes various connections, including an HDMI connection 24, a MIDI connection 26, two universal serial bus (USB) ports 28, 30, and a commercial television control port 32. The commercial television-interfacing dongle 12 includes a housing 40 having two connectors extending therefrom. A control interface 42 couples to the commercial television control port 32 and a USB interface 44 couples to one of the USB ports 28, 30. As shown, the housing 40 includes a shell casing 46 having a cable 48 extending thereform, which forms a portion of the control interface 42. In one implementation, the control interface may be a self-diagnosis interface. Furhter, the self-diagnosis interface may be selected from RJ25 ports, RS232 ports, RS422 ports, RS485 ports, mulitple portocol interaces (MPIs), and multiple telvision interfaces (MTIs), for example. As depicted, the control interface 42 includes an RS232 standard DB-25 connection 50 for the serial communication transmission of data. Such a connection formally defines the signals connecting between a DTE (data terminal equipment) such as a computer terminal, and a DCE (data circuit-terminating equipment, originally defined as data communication equipment. In this instance, the DTE and DCE refer to the commercial television 14 and commercial television-interfacing dongle 12.

A television remote control 56 includes an array of buttons 58 for adjusting various settings such as television channel and volume. In one embodiment, the television remote control 56 may be a consumer infrared (IR) or other protocol, such as Bluetooth, device configured as a small wireless handheld object that issues commands from a distance to the commercial television 14 in order to control the commercial television 14. A wireless-enabled interactive programmable device 60 is present that may be supplied or carried by the guest and may be selected from a range of existing devices, such as, for example iPads®, iPhones®, iPod Touch®, Android® devices, Blackberry® devices, tablets, and laptops. As will be discussed in further detail below, in one implementation, an application installed from a server enables the commercial television-interfacing dongle 12 and wireless-enabled interactive programmable device 60 to be wirelessly paired, when the wireless-enabled interactive programmable device 60 is proximate to the commercial television-interfacing dongle 12. In another embodiment, a challenge-response is utilized to wirelessly pair the commercial television-interfacing dongle 12 and the wireless-enabled interactive programmable device 60.

In one operational embodiment, as shown, a news program P1 on Channel 200 is displayed on the screen 16 of the commercial television 14. The hotel guest may opt not to use the remote control 56. Rather, employing the teachings presented herein, the hotel guest may utilize the paired wireless-enabled interactive programmable device 60 as a remote control device with an enhanced auxiliary audiovisual experience, such as a program guide and virtual remote control, thereon. More particularly, as shown, the commercial television-interfacing dongle 12 is wirelessly communicating with the property server 18 via connection $W_1$ and the wireless-enabled interactive programmable device 60 via connection $W_2$. The wireless-enabled interactive programmable device 60 is reciprocating the paired communication via connection $W_3$.

Referring solely to FIG. 1, enabled, the commercial television-interfacing dongle 12 provides a menu 62 to the wireless-enabled programmable device 60. The menu may be stored on the commercial television-interfacing dongle 12 and periodically updated wirelessly. The menu 62 may include a listing of services, including a program guide, room control (e.g., controlling an amenity in the room remotely), remote functionality, or launching an application to be displayed on the commercial television, for example. It should be appreciated that other virtual button menu arrangements are within the teachings presented herein and the configuration and presentation of the menu will depend on the capabilities of the commercial television and guest services offered, for example.

As shown by arrow 64, the guest utilizing the wireless-enabled programmable device 60 selects the program guide and remote options on the menu 62. The wireless-enabled programmable device 60 then displays an enhanced auxiliary audiovisual experience 66, including a program guide 68 and a virtual remote control 70. The guest then utilizes the enhanced auxiliary audiovisual experience 66 to select a fishing program P2 on channel 202. More particularly, the commercial television-interfacing dongle receives and processes virtual remote control functionality input instructions from the wireless-enabled programmable device 60 and provides a remote control command to the commercial television 12. In one operational embodiment, upon use of the wireless-enabled interactive programmable device 60, the commercial television-interfacing dongle 12 provides advertising instructions via the control interface to the commercial television 14 to superimpose advertising content 72 onto a portion of the screen 16 while the enhanced auxiliary audiovisual experience is being utilized on the wireless-enabled interactive programmable device 60.

Figure 3:
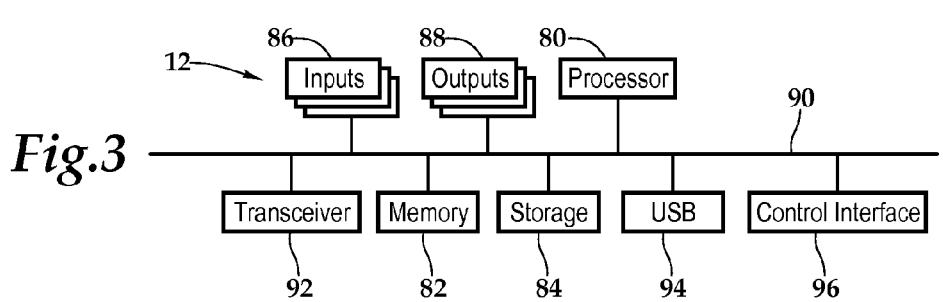
FIG. 3 is a functional block diagram depicting one embodiment of the commercial television-interfacing dongle presented in FIG. 1 and FIG. 2.

With reference to FIG. 2 and FIG. 3, by way of example, the commercial television-interfacing dongle 12 may be an information appliance device that includes a control interface for a commercial television such as a self-diagnosing interface port that facilitates the transfer of information from a non-set-top box, functionality-facing platform. The commercial television-interfacing dongle 12 controls television functions and features by the communication of commands and status information. With respect to the non-set-top box, functionality-facing platform, the commercial television-interfacing dongle 12 generally does not contain set-top box functionality, including having a television-tuner input and displays output through a connection to a display or television set and an external source of signal, turning by way of tuning the source signal into content in a form that can then be displayed on the television screen or other display device. Rather, the commercial television-interfacing dongle 12 provides enhanced functionality including auxiliary audiovisual experiences and parallel application-based audiovisual experiences.

The commercial television-interfacing dongle 12 includes the housing 40 and within the housing 40, a processor 80, memory 82, storage 84, inputs 86, and outputs are interconnected by a bus architecture 136 within a mounting architecture. The processor 80 may process instructions for execution within the dongle-based computing device, including instructions stored in the memory 82 or in the storage 84. The memory 82 stores information within the commercial television-interfacing dongle 12. In one implementation, the memory 82 is a volatile memory unit or units. In another implementation, the memory 82 is a non-volatile memory unit or units. The storage 84 provides capacity that is capable of providing mass storage for the commercial television-interfacing dongle 12. By way of example, the storage 84 may store the program guide, which is periodically updated with communications to the property server 18, such that the program guide provides substantially continuously updated menus displaying broadcast programming and scheduling information for current and upcoming programming to be received by the commercial television from an external source. Various inputs 86 and outputs 88 provide connections to and from the commercial television-interfacing dongle 12, wherein the inputs 86 are the signals or data received by the commercial television-interfacing dongle 12, and the outputs 88 are the signals or data sent from the commercial television-interfacing dongle 12.

With respect to the inputs 86 and the outputs 88, a transceiver 92 is associated with the commercial television-interfacing dongle 12 and communicatively disposed with the bus 90. As shown the transceiver 92 may be internal, external, or a combination thereof to the housing 40. Further, the transceiver 92 may be a transmitter/receiver, receiver, or an antenna for example. Communication between various amenities in the hotel room, the wireless-enabled interactive programmable device 60, the property server 18, or the management server 20, for example, and the commercial television-interfacing dongle 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized. Such transmission techniques may employ a short distance data exchange standard. Additionally, the inputs 86 and the outputs 88 include the USB port 94, which is associated with the USB interface 44 and the control interface 96 port, which is associated with the control interface 42. As previously discussed, in one embodiment, the USB interface 44 and the USB port 94 provide power to the commercial television-interfacing dongle 12 as well as structural support thereto such that the commercial television-interfacing dongle 12, including the housing 40, extends, in horizontal suspension (see horizontal suspension line 74 in FIG. 1), from the commercial television 14. The control interface 42 and control interface port 96 mechanically couple to the commercial television 14 and send various commands to the commercial television 14 using a commercial television control protocol.

By way of example and not by way of limitation, the following table, Table I, summarizes an exemplary commercial television control protocol.

TABLE I

Exemplary Commercial Television Control Protocol

| Command | Action |
| --- | --- |
| Get TV Model | Model Number |
| Get Firmware | Firmware Version Number |
| Get TV Capability | Tuner, Source Inputs, Decryption |
| Get Status | Current TV State |
| TV Power | On/Off |
| Source Selection | HDMI1, HDMI2, Tuner |
| Volume Control | Up/Down |
| Set Volume | Level |
| Get Volume | Level |
| Channel | TV Channel Up/Down |
| Tune Channel | Channel Number |
| Get Channel | Channel Number |
| Navigation | Up, Down, Left, Right, Select |

The memory 82 and storage 84 are accessible to the processor 80 and include processor-executable instructions that, when executed, cause the processor 80 to execute a series of operations. The processor-executable instructions specify a search operation to identify the proximate wireless-enabled interactive programmable device, wherein the search operation utilizes the wireless transceiver to wirelessly identify the proximate wireless-enabled interactive programmable device and establish a pairing between the proximate wireless-enabled interactive programmable device and the commercial television-interfacing dongle. The processor-executable instructions also send formatted auxiliary audiovisual experience instructions to the proximate wireless-enabled programmable interactive device, wherein the formatted auxiliary audiovisual experience instructions are operable to provide a program guide related to the content on the commercial television.

Also, the processor-executable instructions provide instructions for virtual buttons on a touch screen display associated with the proximate wireless-enabled interactive programmable device, the virtual buttons being associated with the commercial television. The processor-executable instructions receive and process virtual remote control functionality input instructions from the proximate wireless-enabled interactive programmable device following, for example, the pressing of a virtual remote control button. Then, the processor-executable instructions send a remote control command to the television via a commercial television control protocol.

Furhter, in one embodiment, the processor-executable instructions provide advertising instructions via the control interface to the commercial television to provide an overlay or superimpose advertising content onto a portion of a screen of the commercial television. The processor-executable instructions may also provide for the configuration of the display on the wireless-enabled interactive programmable device, including alternating between providing the proximate wireless-enabled interactive device the formatted auxiliary audiovisual experience instructions and providing the proximate wireless-enabled interactive programmable device the instructions for virtual buttons. Such instructions may include providing the proximate wireless-enabled interactive programmable device shared screen instructions that place the formatted auxiliary audiovisual experience and virtual buttons on a split screen. Furhter, the processor-executable instructions may receive application-based audiovisual experience instructions from the proximate wireless-enabled interactive programmable device and, based on the application-based audiovisual experience instructions, provide formatted parallel application-based audiovisual experience instructions via the control interface to the commercial television.

A configuration profile is associated with the memory and processor-executable instructions to enable the commercial television-interfacing dongle 12 to control the commercial television. As discussed, the configuration profile being a non-set-top box, functionality-facing platform. Furhter, the configuration profile may be associated with a room in the loading establishment wherein the commercial television-interacting dongle 12 is located, thereby serving as a source of location or room identification.

Figure 4:
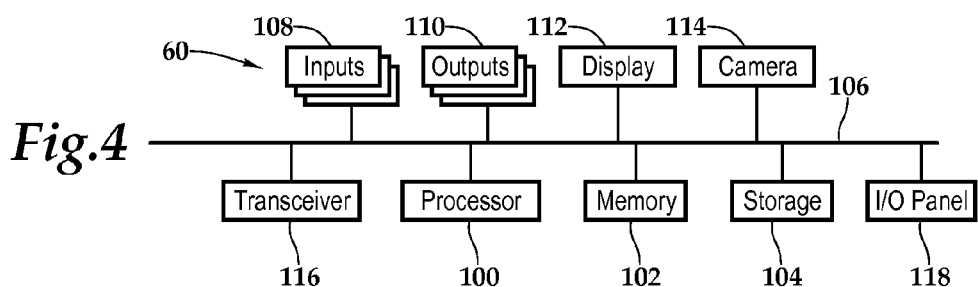
FIG. 4 is a functional block diagram depicting one embodiment of a wireless-enabled interactive programmable device presented in FIG. 1.

Referring now to FIG. 4, the wireless-enabled interactive programmable device 60 may be a wireless communication device of the type including various fixed, mobile, and/or portable devices. To expand rather the limit the previous discussion of the programmable device 60, such devices may include, but are not limited to, cellular or mobile telephones, two-way radios, personal digital assistants, digital music players, Global Position System units, and so forth. The programmable device 60 may include a processor 100, memory 102, and storage 104 interconnected by a bus 106. Inputs 108 and outputs 110 are coupled to the bus 106 and may include a display 112, camera 114, transceiver 116, and an I/O panel 118. It should be appreciated that although a particular architecture is explained, other designs and layouts are within the teachings presented herein.

Figure 5:
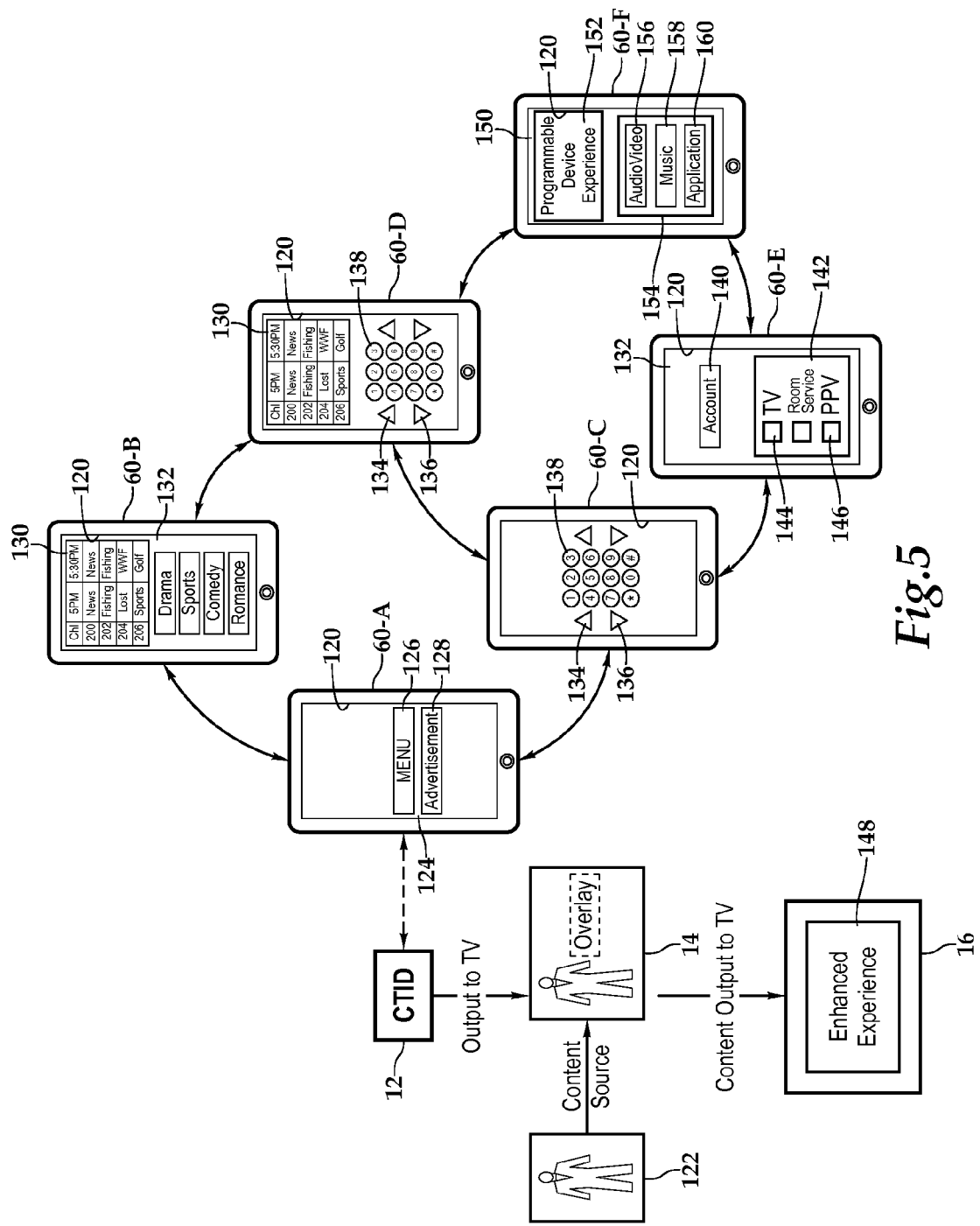
FIG. 5 is a schematic plan view depicting components of the system presented in FIG. 1 in further detail in one operational embodiment.

Referring now to FIG. 5, the pairing between the commercial television-interfacing dongle 12 and the programmable device 60 having a touch screen display 120 is illustrated in further detail, wherein the alphabetical designations A-F used with programmable device 60 indicate particular selectable configurations of the programmable device 60, which are labeled programmable device 60-A through 60-F. As shown, the commercial television 14 receives content 122 from a source and input from the commercial television-interfacing dongle 12 and outputs content to the television screen 16 either the content 122 or a modified version of the content 122, which includes an auxiliary audiovisual experience or parallel audiovisual experience and is designated content 148 as an enhanced experience.

The programmable device 60-A includes content 120 on the touch screen display, which may correspond to the enhanced experience 148 on the television screen 16. As will be discussed in further detail below, the display 120 is formatted and/or scaled for the touch screen display 60. As shown, content 124 includes a menu 126 that provides functionality and may prompt the user to select between particular services and features offered, which may relate to the commercial television, programming, or other amenities in the hotel room. The content 124 also includes an advertisement 128, which may appear on the wireless-enabled interactive programmable device 60. The programmable device 60-B includes content 130 and 132, which includes a program guide and content guide, respectively. The programmable device 60-C includes a virtual remote control 134 having buttons 136 that if pressed by a user causes the corresponding functionality to the commercial television 14 to occur. By way of example, the buttons 136 control volume. By way of further example, buttons 138 include numbers causing channel input and change instructions. More specifically, the commercial television-interfacing dongle 12 receives a virtual remote control functionality instruction from the wireless-enabled interactive programmable device 50-C, which indicates that on touch screen 120 coordinates ($X_{PD}$, $Y_{PD}$) a touch-and-click operation occurred. The commercial television-interfacing dongle 12 translates or de-scales the coordinates ($X_{PD}$, $Y_{PD}$) to coordinates ($X_{STB}$, $Y_{STB}$), which commercial television-interfacing dongle 12 compares against a configuration profile in order to determine that the actuation of the buttons 136 or 138 presents a volume change or channel change operation, for example. The commercial television-interfacing dongle 12 then sends a command signal to the commercial television 14 and the requested volume change, channel change, advertisement insert is accomplished.

The programmable device 60-D includes content 130 and content 134 on the touch screen display 120. The content 130 provides a program guide and the content 134 provides the virtual remote control. As shown, the content 130 is formatted and/or scaled for viewing on only an upper portion of the touch screen display 120 and the content 134 is formatted and/or scaled for viewing on only the lower portion of the touch screen display 120. Similar to the actuation previously described with respect to wireless-enabled interactive programmable devices 60-A through 60-C, the commercial television-interfacing dongle 12 receives a virtual remote control functionality instruction from the programmable device 60-D, which indicates that on touch screen display 120 coordinates ($X_{PD}$, $Y_{PD}$) a touch-and-click operation occurred. The commercial television-interfacing dongle 12 translates or de-scales the coordinates ($X_{PD}$, $Y_{PD}$) to coordinates ($X_{STB}$, $Y_{STB}$), which the commercial television-interfacing dongle 12 compares against the configuration profile in order to determine that the actuation of a particular button initiates the viewing of a television program via the content 130 or a channel change via content 134. The commercial television-interfacing dongle 12 then sends a command signal to commercial television 14 to accomplish the appropriate command. With respect to content, the programmable device 60-E includes an account access menu 140 for accessing the guest's account at the hospitality establishment and a hotel service selection menu 142, including television access 144 and pay-per-view access, for example, among other services such as room service. With respect to the wireless-enabled interactive programmable device 60-F, a parallel programmable device experience 150 may occur at the wireless-enabled interactive programmable device 60. Such an experience may include an audiovisual experience launched by an audiovisual application 156, music from music application 158, or other experience from application 160. It one implementation, the launched audiovisual experience is transmitted to the commercial television-interfacing interactive device 12, which in turn superimposes the experience onto the commercial television 14.

It should be appreciated that the virtual buttons and application launches on wireless-enabled interactive programmable devices 60-E and 60-F have similar functionality to the programmable devices 60-A through 60-D. In one implementation, a user may toggle between the full screen television presentation of the programmable device 60-A or 60-C and the split screen/multi-screen television/remote presentation of the programmable devices 60-B or 60-D, for example, by selectively swiping or clicking a predetermined portion of the touch screen display 60. Once in the split screen television/remote presentation, the user may selectively switch between an array of virtual remote controls corresponding to the configuration profile in the commercial television-interfacing dongle 12, which correspond to the commercial television and/or various amenities in the multi-unit environment.

The system and method may provide a menu-driven environment which may duplicate content on the television, provide related content, furnish an auxiliary experience, furnish a parallel experience, or provide controls for the commercial television or environment in the room. For example, with respect to the auxiliary experience, a channel guide may be provided. By way of another example, providing controls for the environment may include enabling a virtual remote control for operation of the commercial television or, in another embodiment, the thermostat and lighting controls from the wireless-enabled interactive programmable device by way of the commercial television-interfacing dongle.

Thus, the systems and methods disclosed herein may enable users to use existing electronic devices as a temporary remote control device to control a television via a commercial television-interfacing dongle. Therefore the systems and methods presented herein avoid the need for additional or expensive high functionality remote controls or costly set-top boxes. In this respect, the teachings presented herein also include providing the software and/or application for the electronic device or interactive handheld device. The application, to the extent needed, may be downloaded from the Internet or alternatively made available by download from the commercial television-interfacing dongle.

Figure 6:
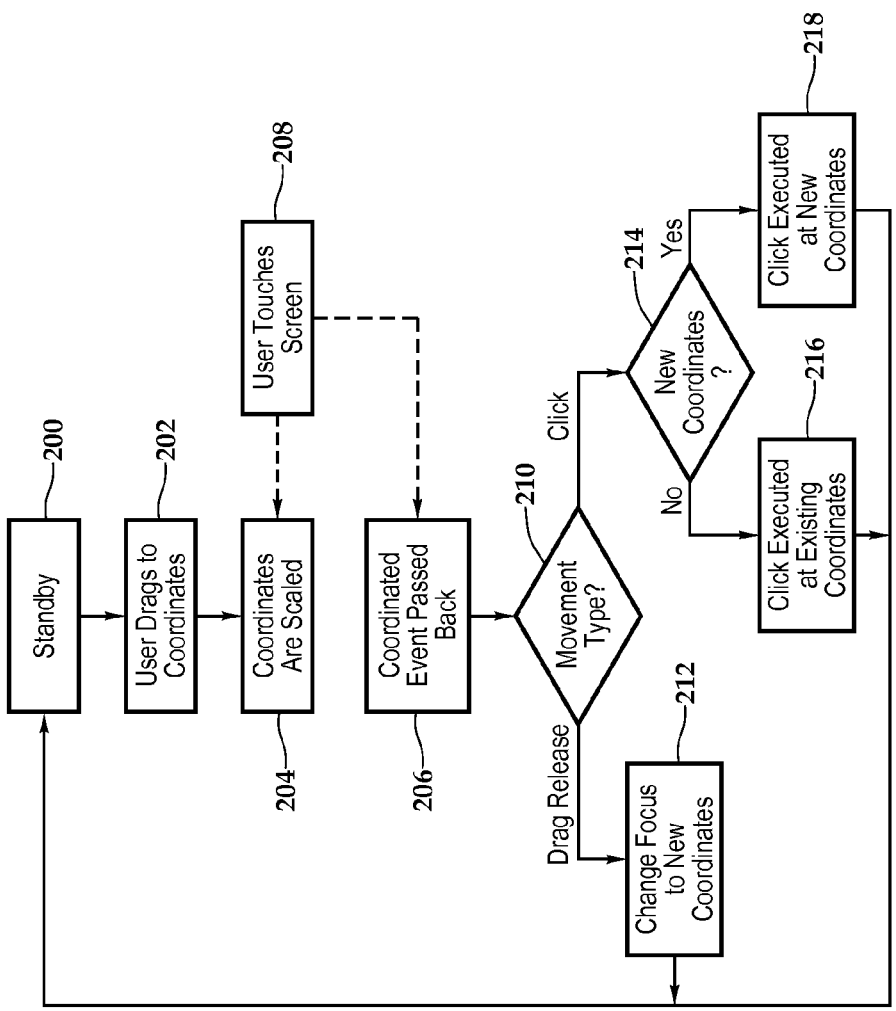
FIG. 6 is a flow chart depicting one embodiment of a method for user touch panel display command execution.

FIG. 6 depicts one embodiment of a method for user touch panel display command execution. At block 200, the methodology is in standby. At block 202, a user drags his or her finger to particular coordinates on the touch screen display of the programmable device. At block 204, the event is transmitted from the programmable device and received by the commercial television-interfacing dongle, where the coordinates are translated from the programmable device coordinates to the commercial television-interfacing dongle coordinates. At block 206, the event is passed back to the programmable device and continued to be monitored. As shown by the dashed lies from block 208, it should be understood that during this process the user may continue to touch the screen.

At decision block 210, the movement type is determined and if a drag release occurred, then the focus of the methodology changes to the new coordinates. On the other hand, if a click movement occurs, then at decision block 214, the methodology forms a tree depending on whether or not the click occurred at existing coordinates (block 216) or new coordinates (block 218). These events are monitored for proper reporting to the commercial television-interfacing dongle 12 from the wireless-enabled interactive programmable device 60 of the location and type of touch-and-click operation, which may include a drag and/or release, occurs.

Figure 7:
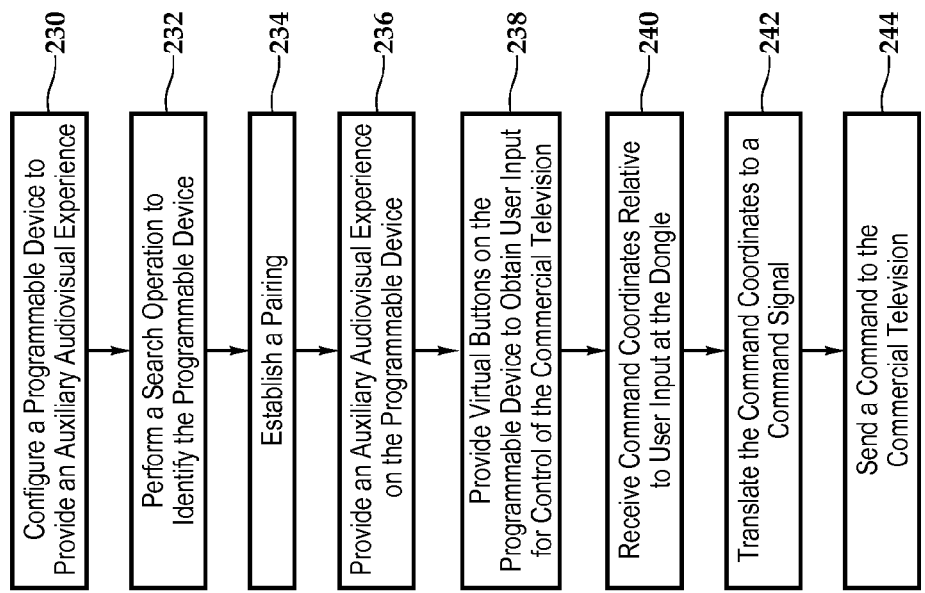
FIG. 7 is a flow chart depicting one embodiment of a method for providing a commercial television-interfacing dongle providing enhanced content and control according to the teachings presented herein.

FIG. 7 depicts one embodiment of a method for providing a remote control device, according to the teachings presented herein. At block 230, the wireless-enabled interactive programmable device is configured to provide an auxiliary audiovisual experience. In one implementation, this may involve using an existing application on the programmable device, such as a browser, or downloading a new application. At block 232, a search, which may be active or passive, is performed by the commercial television-interfacing dongle to identify a physically proximate wireless-enabled interactive programmable device in the multi-room environment. At block 234, a pairing is established prior to a scalable auxiliary audiovisual experience being provided at block 236 on the touch screen display of the proximate wireless-enabled interactive programmable device. The audiovisual experience is auxiliary to the commercial television experience and may include, for example, a menu and program guide having a program listing and schedule. As noted by block 238, this experience may include providing virtual buttons integrated within the audiovisual experience or two or more panels within the touch screen display showing the program guide, for example, and one or more virtual remote controls. As previously discussed, the virtual remote controls and buttons each correspond to the commercial television under the control of the commercial television-interfacing dongle.

At block 240, command coordinates are received from the wireless-enable interactive programmable device at the commercial television-interfacing dongle and these command coordinates are translated into a command signal intended for the commercial television based on the location of the touch-and-click operation, which more generally may be understood as a user interaction, and the auxiliary experience being provided by the commercial television-interfacing dongle to the wireless-enabled programmable interactive device. At block 244, the command is sent from the commercial television-interfacing dongle to the commercial television and the channel is changed accordingly.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A commercial television-interfacing dongle for mechanically connecting to a commercial television, the commercial television-interfacing dongle comprising:

a housing securing a processor, memory, and storage therein;

a busing architecture communicatively interconnecting the processor, the memory, and the storage;

a wireless transceiver associated with the housing and coupled to the busing architecture, the wireless transceiver operable to communicate with a proximate wireless-enabled interactive programmable device;

a control interface associated with the housing and coupled to the busing architecture, the control interface configured to mechanically couple to a commercial television control port of the commercial television;

a universal serial bus (USB) interface associated with the housing and coupled to the busing architecture, the USB interface configured to mechanically couple to the commercial television and provide power therefrom to the commercial television-interfacing dongle;

the memory accessible to the processor, the memory including processor-executable instructions that, when executed, cause the processor to, upon connection of the control interface and USB interface to the commercial television:

specify a search operation to identify the proximate wireless-enabled interactive programmable device, wherein the search operation utilizes the wireless transceiver to wirelessly identify the proximate wireless-enabled interactive programmable device, establish a pairing between the proximate wireless-enabled interactive programmable device and the commercial television-interfacing dongle, send formatted auxiliary audiovisual experience instructions to the proximate wireless-enabled programmable interactive device, wherein the formatted auxiliary audiovisual experience instructions are operable to provide a program guide related to the content on the commercial television, provide instructions for virtual buttons on a touch screen display associated with the proximate wireless-enabled interactive programmable device, the virtual buttons being associated with the commercial television, receive and process virtual remote control functionality input instructions from the proximate wireless-enabled interactive programmable device, and send a remote control command to the commercial television via a commercial television control protocol; and a configuration profile associated with the memory and processor-executable instructions that enables the commercial television-interfacing dongle to control the commercial television;

wherein the memory includes processor-executable instructions that, when executed cause the processor to alternate between providing the proximate wireless-enabled interactive programmable device the formatted auxiliary audiovisual experience instructions, and providing the proximate wireless-enabled interactive programmable device the instructions for virtual buttons.

2. The commercial television-interfacing dongle as recited in claim 1, wherein the control interface further comprises a self-diagnosis interface.

3. The commercial television-interfacing dongle as recited in claim 1, wherein the control interface is selected from the group of self-diagnosis interfaces consisting of RJ25 ports, RS232 ports, RS422 ports, RS485 ports, mulitple portocol interaces (MPIs), and multiple telvision interfaces (MTIs).

4. The commercial television-interfacing dongle as recited in claim 1, wherein the wireless transceiver is configured to communicate with the wireless-enabled interactive programmable device via a standard selected from the group consisting of infrared (IR), 802.11, 3G, 4G, Edge, WiFi, ZigBee, near field communications (NFC), and Bluetooth.

5. The commercial television-interfacing dongle as recited in claim 1, wherein the wireless transceiver is configured to communicate with the wireless-enabled interactive programmable device via a short distance data exchange standard.

6. The commercial television-interfacing dongle as recited in claim 5, wherein the short distance data exchange standard comprises Bluetooth.

7. The commercial television-interfacing dongle as recited in claim 1, wherein the transceiver comprises an antenna.

8. The commercial television-interfacing dongle as recited in claim 1, wherein the wireless-enabled interactive programmable device comprises a device selected from the group consisting of personal computers, laptops, tablet computers, and smart phones.

9. The commercial television-interfacing dongle as recited in claim 1, wherein the memory includes processor-executable instructions that, when executed cause the processor to:
provide the proximate wireless-enabled interactive programmable device shared screen instructions that place the formatted auxiliary audiovisual experience and virtual buttons on a split screen.

10. The commercial television-interfacing dongle as recited in claim 1, wherein the memory includes processor-executable instructions that, when executed cause the processor to:
receive application-based audiovisual experience instructions from the proximate wireless-enabled interactive programmable device and, based on the application-based audiovisual experience instructions, provide formatted parallel application-based audiovisual experience instructions via the control interface.

11. The commercial television-interfacing dongle as recited in claim 1, wherein the program guide is stored in the storage.

12. The commercial television-interfacing dongle as recited in claim 1, wherein the memory includes processor-executable instructions that, when executed cause the processor to:
periodically receive wireless updates via the wireless transceiver to the program guide.

13. The commercial television-interfacing dongle as recited in claim 1, wherein the program guide further comprises substantially continuously updated menus displaying broadcast programming and scheduling information for current and upcoming programming to be received by the commercial television from an external source.

14. The commercial television-interfacing dongle as recited in claim 1, wherein the memory includes processor-executable instructions that, when executed cause the processor to:
wirelessly access an account related to a user of the proximate wireless-enabled interactive programmable device; and
provide the control interface account instructions that place the formatted account audiovisual experience instructions on the commercial television.

15. The commercial television-interfacing dongle as recited in claim 1, wherein the memory includes processor-executable instructions that, when executed cause the processor to:
provide advertising instructions via the control interface to the commercial television to superimpose advertising content onto a portion of a screen of the commercial television.

16. A commercial television-interfacing dongle for mechanically connecting to a commercial television, the commercial television-interfacing dongle comprising:
a housing securing a processor, memory, and storage therein;
a busing architecture communicatively interconnecting the processor, the memory, and the storage;
a wireless transceiver associated with the housing and coupled to the busing architecture, the wireless transceiver operable to communicate with a proximate wireless-enabled interactive programmable device;
a control interface associated with the housing and coupled to the busing architecture, the control interface configured to mechanically couple to a commercial television control port of the commercial television;
a universal serial bus (USB) interface associated with the housing and coupled to the busing architecture, the USB interface configured to mechanically couple to the commercial television and provide power therefrom to the commercial television-interfacing dongle;
the memory accessible to the processor, the memory including processor-executable instructions that, when executed, cause the processor to, upon connection of the control interface and USB interface to the commercial television:
send formatted auxiliary audiovisual experience instructions to the proximate wireless-enabled programmable interactive device, wherein the formatted auxiliary audiovisual experience instructions are operable to provide a program guide related to the content on the commercial television,
provide instructions for virtual buttons on a touch screen display associated with the proximate wireless-enabled interactive programmable device, the virtual buttons being associated with the commercial television,
receive and process virtual remote control functionality input instructions from the proximate wireless-enabled interactive programmable device, and
send a remote control command to the commercial television via a commercial television control protocol; and
a configuration profile associated with the memory and processor-executable instructions that enables the commercial television-interfacing dongle to control the commercial television;
wherein the memory includes processor-executable instructions that, when executed cause the processor to alternate between providing the proximate wireless-enabled interactive programmable device the formatted auxiliary audiovisual experience instructions, and providing the proximate wireless-enabled interactive programmable device the instructions for virtual buttons.

17. The commercial television-interfacing dongle as recited in claim 16, wherein the memory includes processor-executable instructions that, when executed cause the processor to:
provide advertising instructions via the control interface to the commercial television to superimpose advertising content onto a portion of a screen of the commercial television.

18. A commercial television-interfacing dongle for mechanically connecting to a commercial television, the commercial television-interfacing dongle comprising:
a housing securing a processor, memory, and storage therein;
a busing architecture communicatively interconnecting the processor, the memory, and the storage;
a wireless transceiver associated with the housing and coupled to the busing architecture, the wireless transceiver operable to communicate with a proximate wireless-enabled interactive programmable device;
a control interface associated with the housing and coupled to the busing architecture, the control interface configured to mechanically couple to a commercial television control port of the commercial television;
a universal serial bus (USB) interface associated with the housing and coupled to the busing architecture, the USB interface configured to mechanically couple to the commercial television to provide structural support to the commercial television-interfacing dongle and provide power therefrom to the commercial television-interfacing dongle;
the memory accessible to the processor, the memory including processor-executable instructions that, when executed, cause the processor to, upon connection of the control interface and USB interface to the commercial television:
specify a search operation to identify the proximate wireless-enabled interactive programmable device, wherein the search operation utilizes the wireless transceiver to wirelessly identify the proximate wireless-enabled interactive programmable device,
establish a pairing between the proximate wireless-enabled interactive programmable device and the commercial television-interfacing dongle,
send formatted auxiliary audiovisual experience instructions to the proximate wireless-enabled programmable interactive device, wherein the formatted auxiliary audiovisual experience instructions are operable to provide a program guide related to the content on the commercial television,
provide instructions for virtual buttons on a touch screen display associated with the proximate wireless-enabled interactive programmable device, the virtual buttons being associated with the commercial television,
receive and process virtual remote control functionality input instructions from the proximate wireless-enabled interactive programmable device,
send a remote control command to the commercial television via a commercial television control protocol, and
provide advertising instructions via the control interface to the commercial television to superimpose advertising content onto a portion of a screen of the commercial television; and
a configuration profile associated with the memory and processor-executable instructions that enables the commercial television-interfacing dongle to control the commercial television, the configuration profile being a non-set-top box, functionality-facing platform, the configuration profile being associated with a room in a lodging establishment wherein the commercial television-interfacing dongle is located;
wherein the memory includes processor-executable instructions that, when executed cause the processor to alternate between providing the proximate wireless-enabled interactive programmable device the formatted auxiliary audiovisual experience instructions, and providing the proximate wireless-enabled interactive programmable device the instructions for virtual buttons.

19. The commercial television-interfacing dongle as recited in claim 18, wherein the program guide further comprises substantially continuously updated menus displaying broadcast programming and scheduling information for current and upcoming programming to be received by the commercial television from an external source.

* * * * *